United States Patent [19]
Goldfarb

[11] Patent Number: 6,010,107
[45] Date of Patent: Jan. 4, 2000

[54] FLAG HOLDING DEVICE

[75] Inventor: Abraham Goldfarb, Dallas, Tex.

[73] Assignee: National Banner Company, Inc., Dallas, Tex.

[21] Appl. No.: 09/085,991

[22] Filed: May 27, 1998

[51] Int. Cl.$^7$ .................................................. F16M 13/00
[52] U.S. Cl. ...................... 248/512; 116/28 R; 248/538
[58] Field of Search ..................... 248/512, 514, 248/515, 516, 518, 534, 535, 536, 538, 311.2; 116/28 R, 173; 40/591; 224/926

[56] References Cited

U.S. PATENT DOCUMENTS

| | | | |
|---|---|---|---|
| 3,715,821 | 2/1973 | Hawes | 40/591 |
| 3,905,324 | 9/1975 | English | 248/346 X |
| 4,163,426 | 8/1979 | O'Neill | 116/28 R |
| 4,348,978 | 9/1982 | Brucato | 116/28 R |
| 4,519,153 | 5/1985 | Moon et al. | 40/591 |
| 4,590,883 | 5/1986 | Steed et al. | 116/173 |
| 4,593,877 | 6/1986 | Van Der Wyk | 248/512 |
| 4,650,147 | 3/1987 | Griffin | 248/539 |
| 4,884,524 | 12/1989 | Minotti | 116/28 R |
| 4,986,209 | 1/1991 | Spica | 116/28 R |
| 5,233,938 | 8/1993 | Lalo | 116/173 |
| 5,249,381 | 10/1993 | Panossian | 40/591 |
| 5,483,916 | 1/1996 | Kolvites et al. | 116/173 |

*Primary Examiner*—Ramon O. Ramirez
*Attorney, Agent, or Firm*—Locke Liddell & Sapp LLP

[57] ABSTRACT

The present invention relates to a flag holding device for engaging the shaft of a flag or banner to a vehicle window. A preferred embodiment of the device comprises a mounting base, a support clip, and a substantially cylindrical shaft. The mounting base includes a socket and a locking mechanism. The support clip includes an interior arm and an exterior arm which engage the vehicle window and serves a shock absorption function while maintaining the shaft in a substantially upright position. The support clip arms ares preferably rectangular in cross-section, with a ratio of arm thickness to arm width of 1 to 6. A second embodiment includes a mounting base having two sockets for receiving two shafts, the orientation of the two sockets causing the two shafts to engage one another to help prevent accidental removal. A third embodiment includes a mounting base having multiple sockets which enable the mounting base to receive a shaft in a variety of orientations.

27 Claims, 6 Drawing Sheets

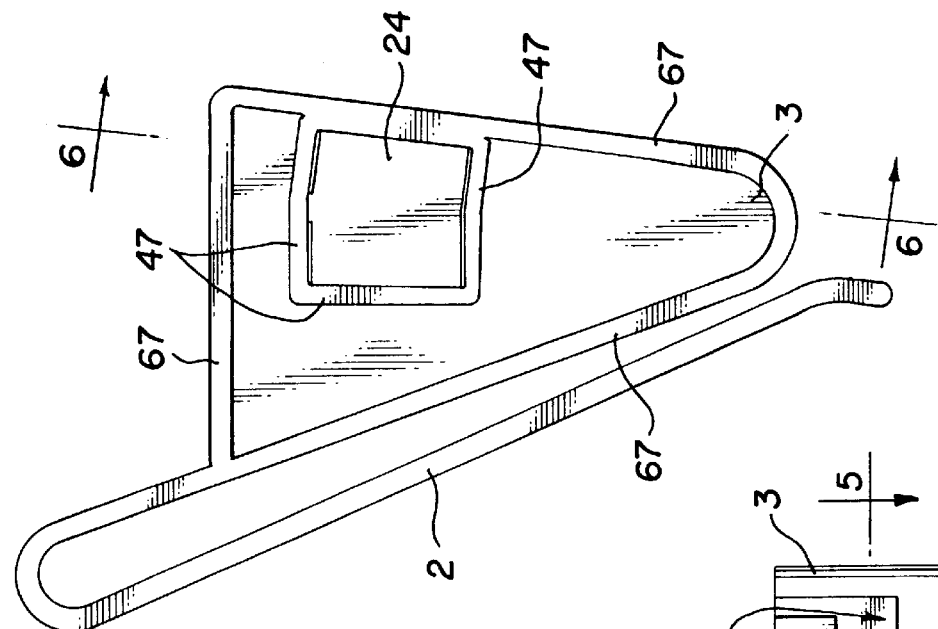
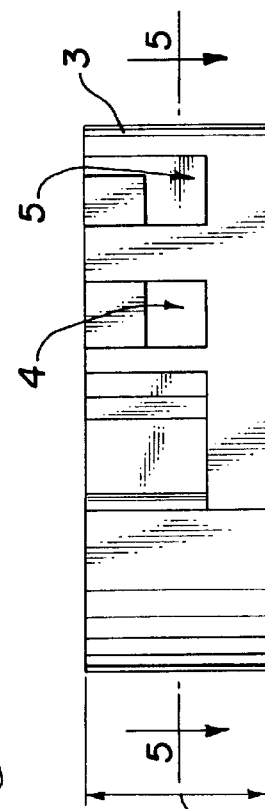
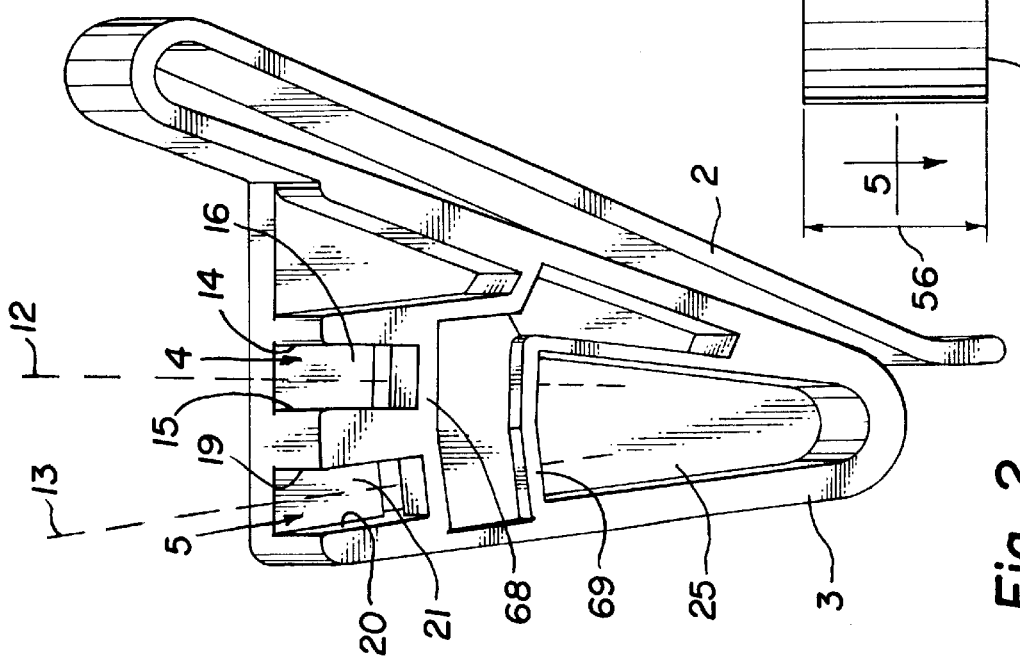

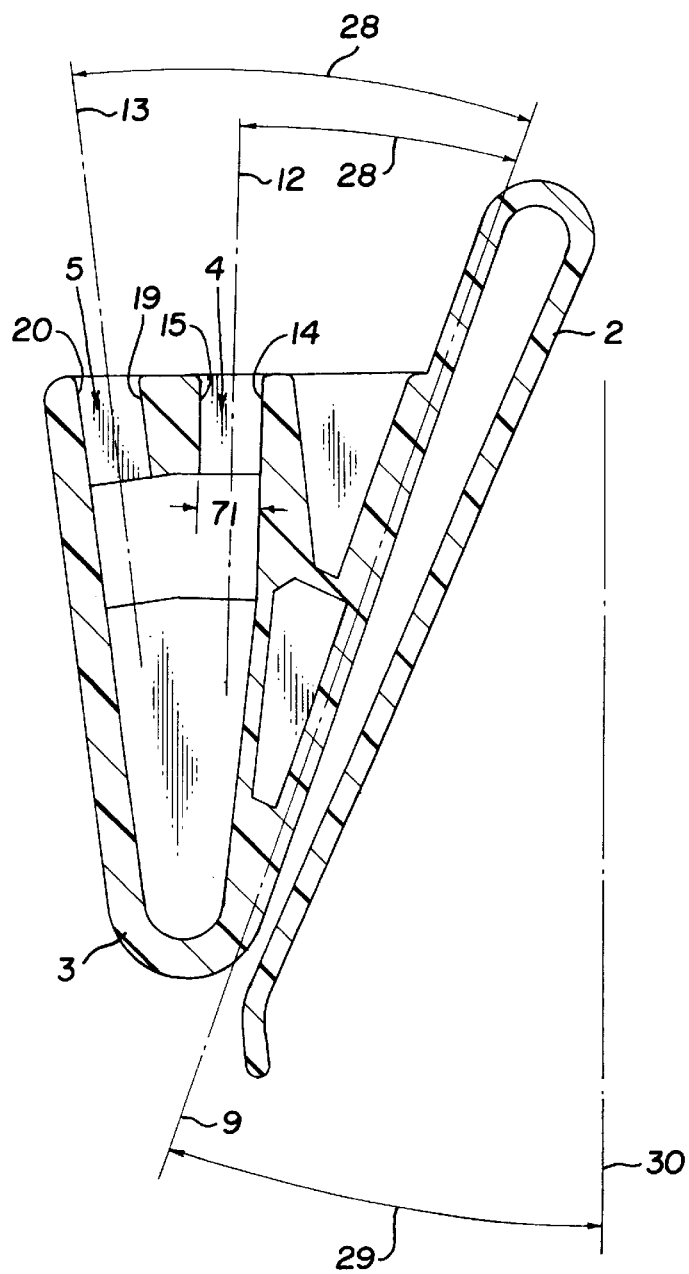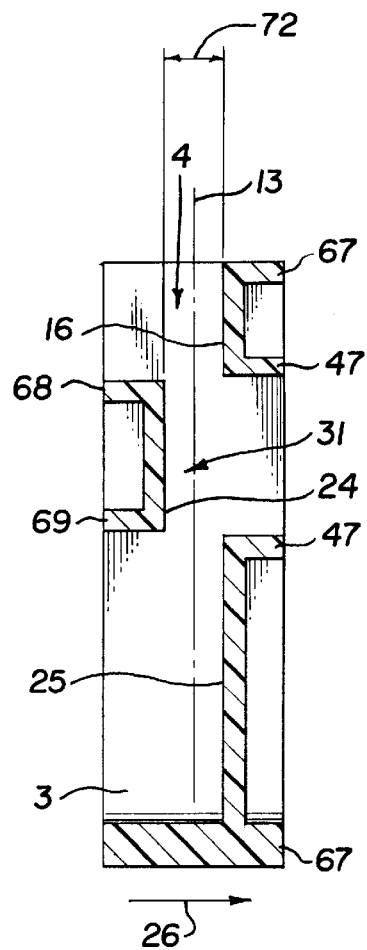
Fig. 5
Fig. 6

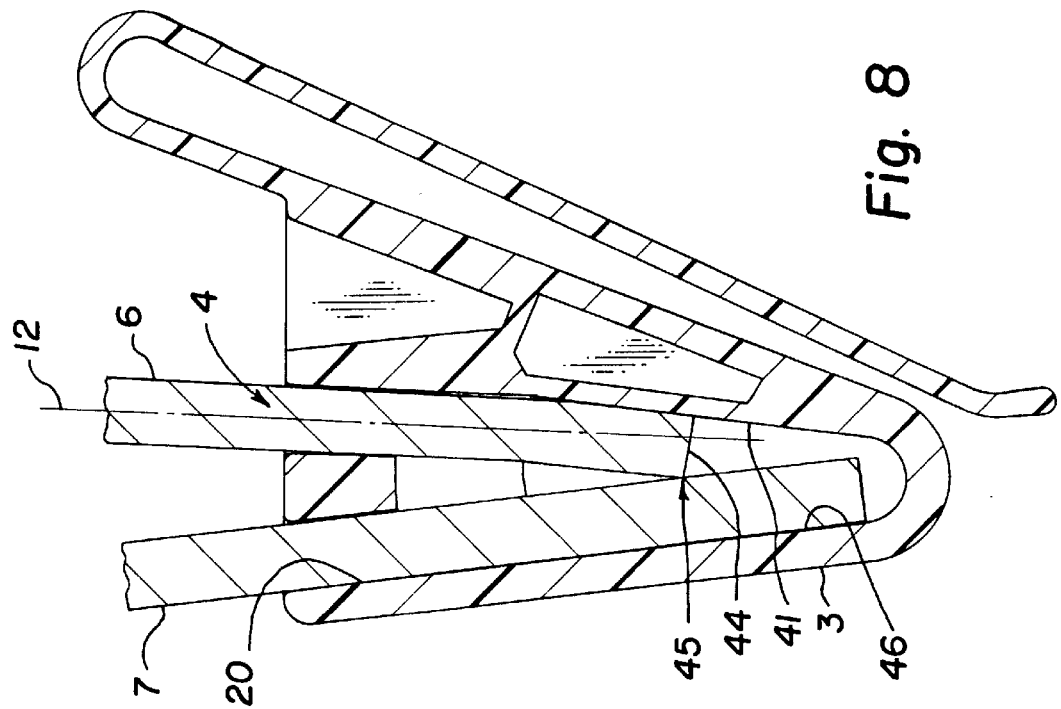
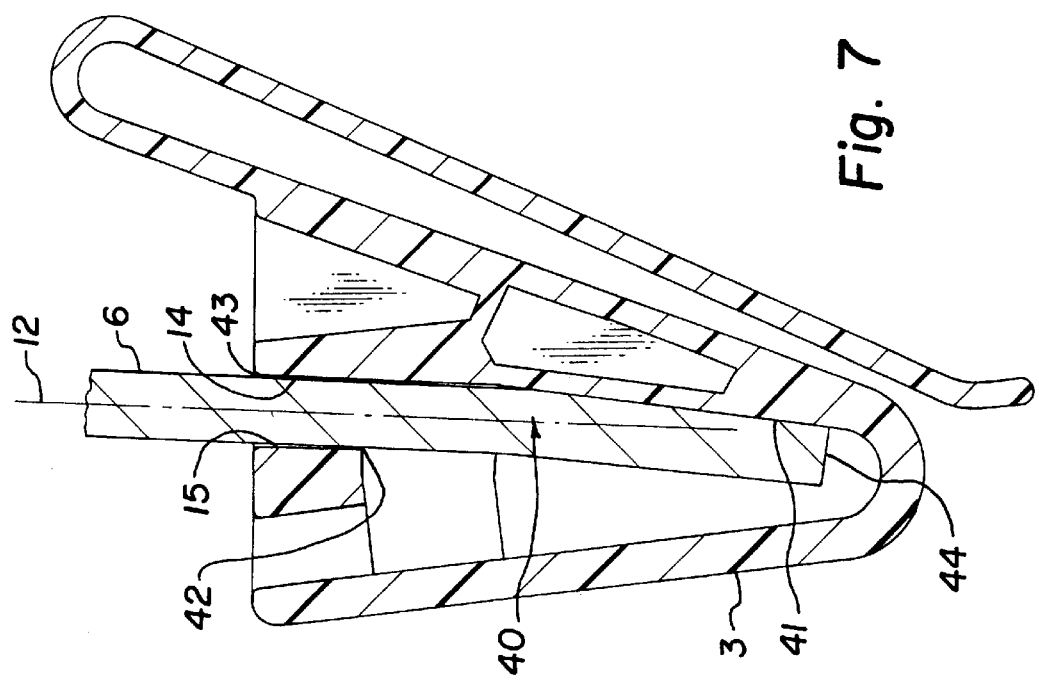

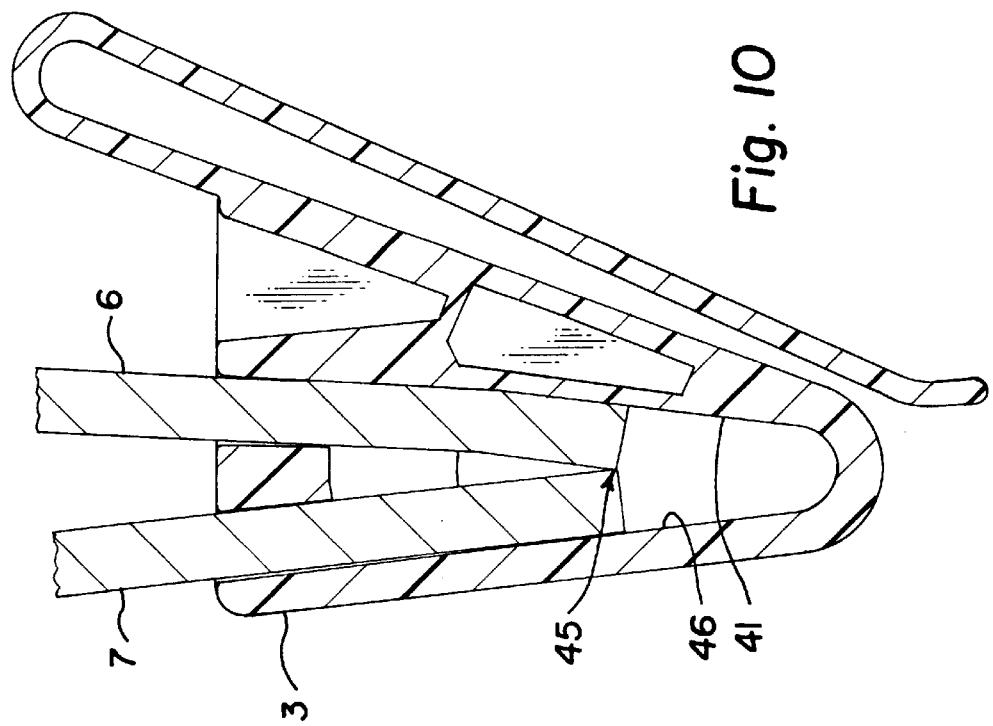
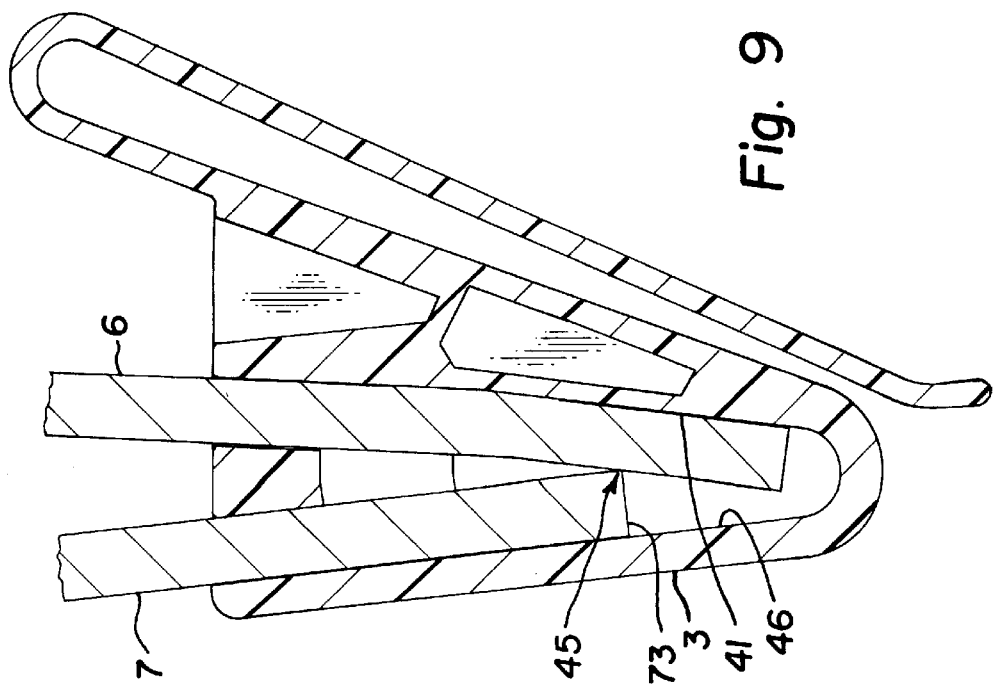

FLAG HOLDING DEVICE

FIELD OF THE INVENTION

This invention relates to mechanisms for holding the shaft of a flag or banner, and more specifically to a device for removably attaching the shaft of a flag or banner to a vehicle window.

BACKGROUND OF THE INVENTION

Automobiles and other vehicles have served as the host for a wide variety of signs, banners, and flags for many years. These flags have served a number of purposes, including: advertising; demonstrating school or team spirit; indicating vehicle or driver distress; and designating vehicles in a funeral procession. Many devices have also been developed to facilitate the attachment of these signs, banners, and flags to automobiles or other vehicles, and various patents have been issued in the past on devices disclosing some form of flag holding device.

U.S. Pat. No. 4,986,209 to Spica, discloses a portable display means primarily for use as an emergency distress signal. The signal includes an s-shaped channel member having three walls which engages a shaft between two of the walls and a vehicle window between two of the walls. The shaft is also held in place by a locator means.

U.S. Pat. No. 5,483,916 to Kolvites, et al., discloses a flag display device having a suction-cup for engaging a vehicle surface and an adjustment mechanism for adjusting the position of a shaft relative to the vehicle surface.

U.S. Pat. No. 5,249,381 to Panossian, discloses a vehicle emergency sign, a plurality of interconnected sign panels, and a bracket for mounting the sign on a vehicle window.

U.S. Pat. No. 4,884,524 to Minotti, discloses a vehicle distress signal having a banner and a clamp for engaging the banner to a vehicle door. The banner includes an attention attraction means, specifically a plurality of electric lights.

U.S. Pat. No. 4,348,978 to Brucato, discloses a signal device comprising a flag and a flag pole, the flag pole having a handle portion and a mounting portion for engaging the pole to a vehicle window.

U.S. Pat. No. 4,650,147 to Griffin, discloses a flagstaff for automotive uses including an elongated pole with fasteners for attaching a flag, and a bracket for attaching the pole to a vehicle window. The pole is specially designed to engage the bracket.

U.S. Pat. No. 5,233,938 to Lalo, discloses a vehicle flag system comprising a flag, a flag mast, and a mount, the mast being configured at its lower end with a mating non-circular cross section which engages the mount.

U.S. Pat. No. 4,519,153 to Moon, et al., discloses a display device for use on automobiles having a removable staff and a decorative flag and a bracket, the lower portion of the staff including a bifurcated portion and an enlarged ridge.

U.S. Pat. No. 4,590,883 to Steed, et al., discloses a flag mounting having a flag, a separable two piece flag mast, and a mounting means.

U.S. Pat. No. 4,163,426 to O'Neill, discloses a highway safety device having a supporting unit, a pole, a flag, and a light atop the pole. The supporting unit and pole are integrally attached.

All of these devices have suffered from severe limitations. None of the above patents disclose a flag holding device in which more than one shaft is engaged. Though Kolvites provides a device capable of adjusting the orientation of a shaft, none of the above patents disclose a flag holding device in which multiple fixed sockets offer alternative orientations for a shaft. The above patents also fail to provide a flag-holding device capable of engaging a simple cylindrical shaft on a moving vehicle through compression, while simultaneously engaging a vehicle window with sufficient flexibility to prevent breakage of a frangible shaft.

SUMMARY OF THE INVENTION

The flag holding device of the present invention functions to removably engage a shaft to a vehicle window. One embodiment of the device includes a cylindrical shaft, a mounting base, and a support clip. The mounting base includes a socket which receives the shaft and a locking structure for preventing accidental removal of the shaft from the socket by exerting a compressive force against the shaft. The window support is coupled to or integrally molded with the mounting base and flexibly engages the vehicle window so as to absorb shocks imparted to the device by wind resistance or sudden changes in the speed of the vehicle while maintaining the shaft in a substantially upright position. The window support has an interior arm and an exterior arm which contact opposing sides of the engaged vehicle window.

An embodiment of the flag holding device of the present invention also removably engages multiple shafts. This embodiment includes a first shaft, a second shaft, a mounting base and a window support. The mounting base has a first socket and a second socket which receive the first shaft and the second shaft respectively, and orient the shafts so that they engage one another and prevent the accidental removal of the shafts. The window support again engages the vehicle window and also is coupled to the mounting base.

A third embodiment of the flag holding device of the present invention includes a plurality of sockets for removably engaging a shaft in multiple possible orientations.

BRIEF DESCRIPTION OF THE DRAWINGS

FIG. 2 is a rearward perspective view of the mounting base and support clip of a preferred embodiment of the flag holding device.

FIG. 3 is a forward view of the mounting base and support clip of a preferred embodiment of the flag holding device.

FIG. 4 is a top view of the mounting base and support clip of a preferred embodiment of the flag holding device.

FIG. 5 is a sectional rearward view of the mounting base and support clip of a preferred embodiment of the flag holding device.

FIG. 6 is a sectional side view of the mounting base of a preferred embodiment of the flag holding device taken through the central axis of the first socket.

FIG. 7 is a sectional rearward view of the mounting base, support clip, and first shaft of a preferred embodiment of the flag holding device illustrating a displacement locking structure.

FIG. 8 is a sectional rearward view of a preferred embodiment of the flag holding device illustrating an intersection locking structure.

FIG. 9 is a sectional rearward view of a preferred embodiment of the flag holding device illustrating an intersection locking structure and an alternate form of shaft engagement.

FIG. 10 is a sectional rearward view of a preferred embodiment of the flag holding device illustrating an intersection locking mechanism and a second alternate form of shaft engagement.

DETAILED DESCRIPTION OF THE INVENTION

The present invention involves a flag holding device for engaging one or more shafts to a vehicle window. The shaft(s) may be used for a wide variety of purposes, including the support of flags, banners, or other displays. These displays may in turn be utilized for a variety of purposes, including: advertising (car sales or otherwise); designating cars in funeral processions; demonstrating allegiance to schools, organizations, nations, or other groups; and indicating vehicle or passenger distress. Though the instant invention may be used for such purposes, it is to be understood that the invention is not limited to those purposes and may be used to achieve different ends. Furthermore, though the device is described as a "flag" holding device, it should be understood that the device actually hold "shafts," which may in turn hold flags, banners, or other displays, or may in turn hold nothing at all. While the device may take a variety of forms and have numerous options present or not present, the illustrated embodiment includes many major options, some of which, while preferred, are not necessary for proper operation of the invention.

Figure 1:
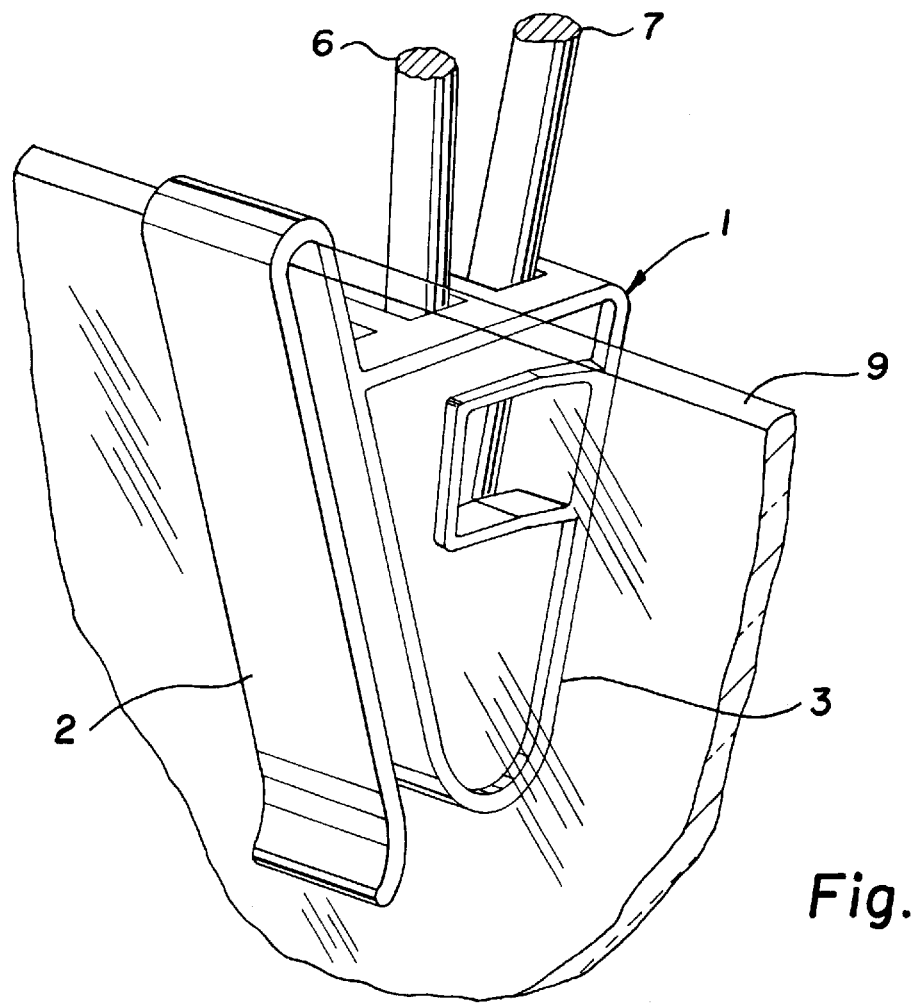
FIG. 1 is a forward left perspective view of a preferred embodiment of the flag holding device.

FIG. 1 provides a forward left perspective view of a preferred embodiment of the flag holding device 1 of the present invention as attached to a vehicle window 9. The flag holding device of the instant invention comprises a mounting base 3 and a support clip 2. Device 1 of the illustrated preferred embodiment further comprises a first shaft 6 and a second shaft 7. Mounting base 3 removably engages first shaft 6 and second shaft 7. Support clip 2 couples or engages mounting base 3 and removably engages vehicle window 9. Though mounting base 3 is preferably integrally attached to support clip 2, this invention encompasses devices in which mounting base 3 is not integrally attached to support clip 2. Another embodiment of the flag holding device of the instant invention further comprises vehicle window 9.

The mounting base of the device is advantageously designed to be capable of removably engaging simple cylindrical shafts, such as an industry standard 0.25 inch diameter wooden dowel. This is a distinct advantage over existing flag holding devices which can only removably engage non-conventional shafts specifically designed for a particular type of flag holding device. The ability to use inexpensive cylindrical shafts greatly improves the adaptability of the flag holding devices of the present invention. The mounting base of the preferred embodiment is also designed to be capable of either: (1) receiving a plurality of shafts simultaneously; or (2) receiving a single shaft in a variety of positions and orientations. These capabilities also enhance the adaptability of the flag holding device.

Figure 1A:
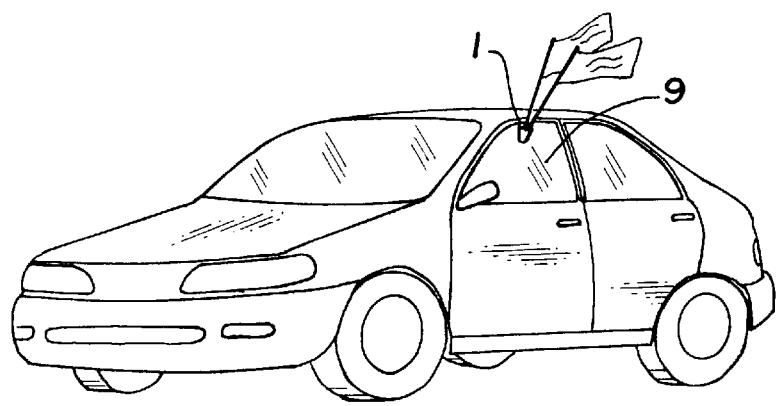
FIG. 1A is a perspective view illustrating a preferred embodiment of the flag holding device as engaged vehicle window.

FIG. 1A provides a perspective view of a preferred embodiment illustrating the embodiment as engaged to a vehicle window.

FIG. 2 provides a rearward perspective view of mounting base 3 and support clip 2 of the preferred embodiment illustrated in FIG. 1. As illustrated, mounting base 3 includes a first interior surface 14, a first exterior surface 15, a second interior surface 19, a second exterior surface 20, a first upper forward surface 16, a second upper forward surface 21, a rearward surface 24 (not visible), a lower forward surface 25, a upper rearward shoulder 68 and a lower rearward shoulder 69 (shoulders 68 & 69 are discussed in greater detail below).

The terms "forward" and "rearward" are applied to the surfaces of mounting base 3 to reflect the surfaces' relative positions when device 1 is engaged to the upper edge of a vehicle window located to the left of the vehicle's driver. In such an arrangement the "forward" surfaces are closer than the "rearward" surfaces to the front of the vehicle. It should be understood, however, that this orientation has only been chosen for convenience and that device 1 may also be used on a vehicle window to the driver's right side, among other acceptable locations, in which case the "forward" surfaces will in fact be closer to the rear of the vehicle. Indeed, this reversibility is one advantage offered by the instant invention.

Mounting base 3 has a first socket 4 which is bounded by first interior surface 14, first exterior surface 15, first upper forward surface 16, rearward surface 24, and lower forward surface 25. First socket 4 defines a first central axis 12 along which mounting base 3 receives first shaft 6. Mounting base 3 also has a second socket 5 which is bounded by second interior surface 19, second exterior surface 20, second upper forward surface 21, rearward surface 24, and lower forward surface 25. Second socket 5 defines a second central axis 13 along which mounting base 3 receives second shaft 7.

FIG. 3 provides a forward view of mounting base 3 and support clip 2 of the preferred embodiment of FIG. 2. FIG. 3 illustrates rearward surface 24 of mounting base 3, and further illustrates an inner forward shoulder 47 and an outer forward shoulder 67 (shoulders 47 & 67 are discussed in further detail below).

FIG. 4 provides a top view of mounting base 3 and support clip 2 of the preferred embodiment of FIG. 2. FIG. 4 specifically provides a view into first socket 4 and second socket 5, and also illustrates the width 56 of support clip 2 and mounting base 3.

FIG. 5 provides a sectional rearward view of mounting base 3 and support clip 2 of the preferred embodiment of FIG. 2, and illustrates the orientation of first socket 4 and second socket 5 with respect to the vertical axis 30. It is often desirable for at least one of central axes 12 & 13 (and thereby shafts 6 & 7) to be oriented in a nearly vertical position when flag holding device 1 is engaged to vehicle window 9 (illustrated in FIG. 5 as an axis). In some cases it is also desirable that the orientation of central axes 12 & 13 not parallel the orientation of vehicle window 9, so as to avoid vehicle components which may overhang vehicle window 9.

Two factors which influence the orientation of central axes 12 & 13 relative to vertical axis 30 are: (1) the angle 28 between central axes 12 & 13 and vehicle window 9; and (2) the angle 29 between vehicle window 9 and vertical axis 30. Angle 29 between vehicle window 9 and vertical axis 30 is not consistent among different vehicle types. One advantage of multiple socket mounting base 3 is that, because of the multiple possible angles between vehicle windows and multiple available central axes 12 & 13, flag holding device 1 can approach near-vertical positioning of at least one central axis 12 or 13 in a larger number of vehicle types than a single socket device of the prior art. Vehicle components overhanging vehicle window 9 can also be avoided more frequently with the instant device than with single socket devices. In the preferred embodiment illustrated in FIG. 5, near vertical orientation of at least one central axis 12 or 13 of sockets 4 or 5 can be achieved when the device 1 is used in concert with vehicle window 9 wherein angle 29 is approximately 25 or 30 degrees.

FIG. 5 also illustrates the relationship between the interior and exterior surfaces of the sockets 4 & 5 of mounting base 3. Specifically, first exterior and first interior surfaces 15 & 14 are disposed substantially parallel to each other and perpendicular to forward and rearward surfaces of mounting base 3. Second exterior and second interior surfaces 20 & 19 are also disposed substantially parallel to each other and perpendicular to the forward and rearward surfaces of mounting base 3. The distance 71 between the planes defined by first interior surface 14 and first exterior surface 15 is slightly larger than the diameter of first shaft 6. This permits easy insertion of first shaft 6 into first socket 4 while simultaneously allowing first socket 4 to perform its shaft positioning function. The distance between second interior and second exterior surfaces 19 & 20 is similarly determined.

FIG. 6 provides a sectional side view of mounting base 3 of the preferred embodiment of FIG. 2. The cross-section is taken perpendicular to the view of FIG. 5 and along first central axis 12 of first socket 4. This view demonstrates the relationship between the forward and rearward surfaces of mounting base 3. Specifically, lower forward surface 25, first upper forward surfaces 16, and rearward surface 24 are disposed substantially parallel to each other and, when device 1 is engaged to the upper edge of vehicle window 9, substantially perpendicular to the ordinary line of travel 26 of the host vehicle. As illustrated, lower forward surface 25 and first upper forward surface 16 are also substantially co-planar, though it is not a requirement of this invention that these surfaces be co-planar.

In the illustrated embodiment, the distance 72 between the plane defined by first upper forward surface 16 and lower forward surface 25 and the plane defined by rearward surface 24 is preferably less than that found between first interior and first exterior surfaces 14 & 15. The resulting tighter fit of first shaft 6 between the forward surfaces and rearward surface advantageously provides for greater stability of first shaft 6 within first socket 4 along ordinary line of travel 26 of the host vehicle. This is preferred due to the wind resistance experienced along ordinary line of travel 26.

Though not illustrated in FIG. 6, the forward and rearward surfaces of second socket 5 operate in a similar manner as the forward and rearward surfaces of first socket 4. Second upper forward surface 21 is substantially co-planar with lower forward surface 25 (and first upper forward surface 16) and parallel to rearward surface 24. The distance between the plane defined by second upper forward surface 21 and lower forward surface 25 and the plane defined by rearward surface 24 is preferably less than that found between second interior and second exterior surfaces 19 & 20.

Though the preferred embodiment illustrated in FIGS. 1–6 uses a specific socket design, it is to be understood that the instant invention is not limited to sockets of that design, and that a wide variety of socket designs are acceptable for use in the instant invention. The present invention encompasses socket designs of all cross-sections capable of defining an central axis along which a shaft may be received by the mounting base. Acceptable cross-sections of sockets include, but are not limited to: circular, oval, rectangular, and triangular cross-sections. Cross-sections may be consistent along the length of a socket or may vary along the length of a socket.

Though sockets 4 & 5 define first and second central axis 12 & 13 along which mounting base 3 receives shafts 6 & 7, it is also necessary to fix shafts 6 & 7 to specific positions along first and second central axes 12 & 13. In the preferred embodiment of this invention, shafts 6 & 7 lock into a specific position automatically upon mutual insertion into mounting base 3. This locking action is accomplished through locking structures. Shafts 6 & 7 may then be "pulled" from mounting base 3 upon the application of a sufficient force, but accidental removal is prevented. To simplify and reduce the cost of manufacturing, the locking structures operate through compression, squeezing shafts 6 & 7 and frictionally preventing their accidental removal. The locking structures preferably use no moving parts (other than parts that merely deform when used). As discussed above, this invention advantageously provides locking structures appropriate for use with conventional cylindrical shafts.

FIG. 6 further illustrates the first locking structure of mounting base 3 of the preferred embodiment of FIG. 2. This type of locking structure can be designated a woven locking structure, and the first locking structure of the illustrated embodiment can be designated first woven locking structure 31. Woven locking structures comprise a first locking surface, a second locking surface, and a third locking surface. In the illustrated embodiment first upper forward surface 16, rearward surface 24, and lower forward surface 25, act respectively as the first, second and third locking surfaces of first woven locking structure 31. First shaft 6 contacts first upper forward surface 16, rearward surface 24, and lower forward surface 25 in that order when inserted into first woven locking structure 31. As rearward surface 24 contacts a side of first shaft 6 substantially opposite the side of first shaft 6 contacted by first upper forward surface 16 and lower forward surface 25, first shaft 6 appears to weave itself among the surfaces of first woven locking structure 31. Though the component surfaces of first woven locking structure 31 also serve a second function as surfaces of first socket 4 in the illustrated embodiment, advantageously providing more efficient material use and simplifying construction, it is to be understood that the surfaces of the sockets need not serve such a dual role.

In the preferred embodiment of first woven locking structure 31, illustrated in FIG. 6, distance 72 between the plane defined by first upper forward surface 16 and lower forward surface 25 and the plane defined by rearward surface 24 is equal to or slightly less than (i.e. not more than) the diameter of first shaft 6. This size limitation encourages either: (1) various edges of the surfaces of first woven locking structure 31 to "bite" into the sides of first shaft 6, or (2) the sides of first shaft 6 to bite into various edges of the surfaces of first woven locking structure 31. In this preferred embodiment either the material of first shaft 6, or the material of the bitten edges of the surfaces of first woven locking structure 31, or both, is slightly elastically deformable.

Though not illustrated in FIG. 6, mounting base 3 further includes a second locking structure which is another example of a woven locking structure. This second woven locking structure comprises a fourth locking surface, a fifth locking surface, and sixth locking surface. These surfaces correspond to second upper forward surface 21, rearward surface 24, and lower forward surface 25. This second woven locking structure functions in substantially the same manner as first woven locking structure 31.

The rigidity of the construction of the woven locking structures is one factor in determining the strength of engagement between the shafts and the mounting base. Rigid materials maintain a tighter fit between the flag shafts and locking structure surfaces over a period of use more readily than less-rigid materials, and help maintain engagement between the shafts and mounting base during high stress situations such as high speed travel by a host vehicle.

FIG. 6 illustrates one option for improving the rigidity of the mounting base generally and the locking structure surfaces specifically. As illustrated, device 1 incorporates a system of shoulders, including inner forward shoulder 47, outer forward shoulder 67, upper rearward shoulder 68, and lower rearward shoulder 69, which extend perpendicularly from forward and rearward surfaces 16, 21, 25, & 24. Hence, in the illustrated embodiment, shoulders 47, 67, 68, & 69 extend parallel to ordinary line of travel 26. It is to be understood that the shoulders of this invention may also extend from other surfaces and in other directions to improve mounting base 3 rigidity.

Though first woven locking structure 31 and the second woven locking structure represent specific embodiments of woven locking structures, it is to be understood that the woven locking structures of this invention may incorporate a variety of other designs. The required features of a woven locking structure are that: (1) at least three points of contact exist between the woven locking structure and the cylindrical surface of the locked shaft, and (2) the points of contact are distributed about the surface of the locked flag shaft to prevent movement of the shaft (i.e. one point of contact (a) in located on a side of the shaft substantially opposite the side contacted by the remaining two points of contact, and (b) is disposed between the remaining two points of contact along the length of the shaft).

FIG. 7 illustrates the third locking structure of the illustrated embodiment which may be designated displacement locking structure 40, and which comprises first interior surface 14, first exterior surface 15 and a displacing surface 41. Displacing surface 41 is not parallel to either first interior surface 14 or first exterior surface 15, and attempts to push first shaft 6 off first central axis 12 of first socket 4. The force exerted by displacing surface 41 pushes shaft 6 against the lower edge 42 of first exterior surface 15 and the upper edge 43 of first interior surface 14. Displacement locking structure 40 is essentially an alternate embodiment of a woven locking structure in which the plane defined by one of the component surfaces is not parallel to the other component surfaces and instead crosses the central axis of relevant socket. While the defined plane may cross the central axis of the relevant socket, however, the component surface does not necessarily do so. This alternate embodiment is advantageously less dependent upon the distance between its component surfaces than woven locking structure 31.

In the preferred embodiment, displacing surface 41 is located along central first axis 12 of first socket 4 and between: (1) the inserted end 44 of first shaft 6 and (2) both first exterior and first interior surfaces 14 & 15. This helps localize any resulting bending of first shaft 6 to that portion of first shaft 6 that has been inserted into or through first socket 4. The use of both first woven locking structure 31 and displacing locking structure 40 to fix the position of first shaft 6 increases the strength of the engagement between first shaft 6 and mounting base 3.

FIG. 8 illustrates the fourth locking structure of the illustrated embodiment which may be designated an intersection locking structure generally and intersection locking structure 45 specifically. Intersection locking structure 45 comprises first shaft 6, second shaft 7, displacing surface 41 and a compression surface 46. In the preferred embodiment illustrated, compression surface 46 is co-planar with, and an extension of, second exterior surface 20. Displacing surface 41 directs end 44 of first shaft 6 away from first central axis 12 of first socket 4 and toward second shaft 7. End 44 of first shaft 6 contacts the side of second shaft 7 and forces second shaft 7 against compression surface 46. As the angle of intersection between first and second shafts 6 & 7 is less than 90 degrees, the contact between first and second shafts 6 & 7 also forces first shaft 6 against displacing surface 41. It should be understood that the particular design of the illustrated embodiment is merely one example of an intersection locking structure, however, and that intersection locking structures merely require that a first shaft contacts or engages a second shaft and provides a force which pushes the first shaft against some surface of the mounting base.

The intersection locking structure of FIG. 8 advantageously also provides the ability to differentiate the display height of flags or banners engaged to shafts of similar length. Specifically, when the form of engagement between the shafts illustrated in FIG. 8 is used, one shaft is inserted farther into the mounting base than the other shaft. When the shafts are of similar height, this difference in insertion depth creates a corresponding difference in the position of the upper ends of the shafts (and any flags or banners connected to those upper ends).

FIG. 9 illustrates an alternate form of engagement between first and second shafts 6 & 7. Specifically, the end 73 of second shaft 7 contacts the side of first shaft 6 and forces first shaft 6 against displacing surface 41.

FIG. 10 illustrates a second alternate form of engagement between first and second shafts 6 & 7. Specifically, the side of first shaft 6 contacts the side of second shaft 7, forcing first shaft 6 against displacing surface 41 and second shaft 7 against compression surface 46.

Intersection locking structures increase the strength of the engagement between shafts and a mounting base. This is particularly advantageous given the increased wind resistance (and corresponding stress on the flag holding device) experienced through the use of multiple shafts and their accompanying flags. Though the preferred embodiments illustrated in FIGS. 9–10 include a single displacing surface, the instant invention is intended to encompass intersection locking structures which. also include a second displacement surface directing the second shaft away from the second central axis of the second socket and toward the first shaft. Intersection locking structures may also include no displacing surfaces when the first shaft and the second shaft would contact or engage without displacement from the central axes of their respective sockets.

Though several specific embodiments of locking structures have been disclosed, it is to be understood that the instant invention encompasses other embodiments of locking structures. For example, a locking structure may utilize only two locking surfaces if the two corresponding contact areas are on substantially opposite ends of a diameter of the engaged shaft. It also should be understood that locking edges or locking points may be substituted for locking "surfaces" in the instant invention, though "surfaces" are preferable in that they provide a larger area over which to distribute the force applied to a shaft. The one requirement of acceptable locking structures is that they are able to engage a simple cylindrical shaft.

Figure 11:
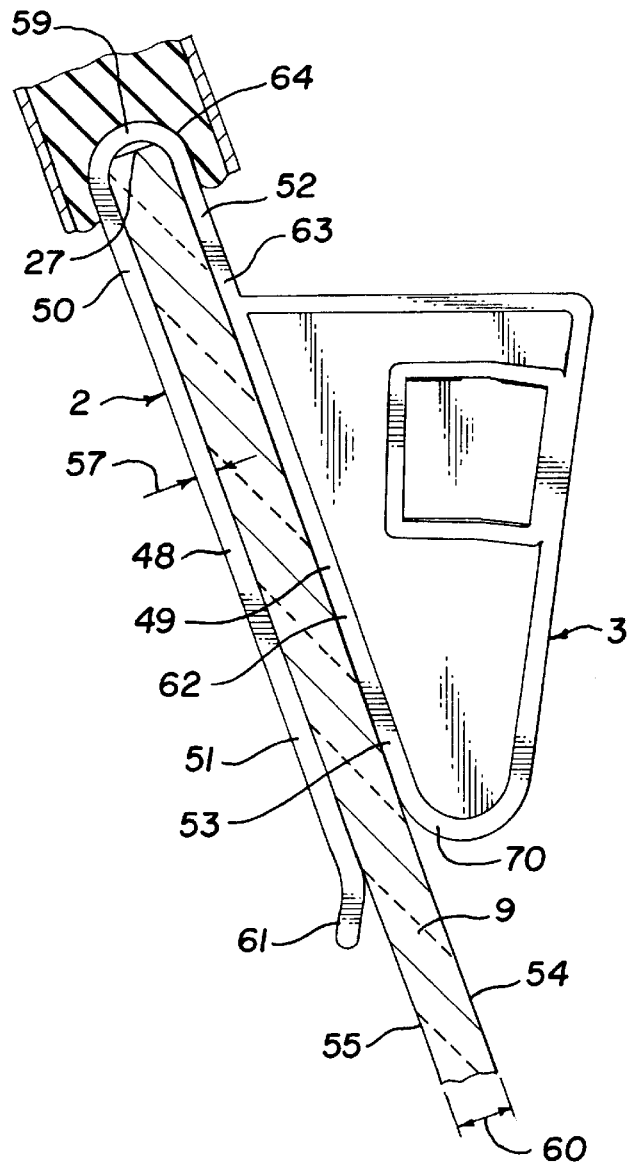
FIG. 11 is a forward view of the mounting base and support clip of a preferred embodiment of the flag holding device engaged to a vehicle window and slot.

FIG. 11 provides a forward view illustrating a mounting base 3 and support clip 2 of a preferred embodiment of device 1 engaged to vehicle window 9. Support clip 2 has an interior arm 48 and an exterior arm 49. Interior arm 48 has an upper end 50 and a lower end 51, and exterior arm 49 has an upper end 52 and a lower end 53. Upper end 50 of interior arm 48 engages upper end 52 of exterior arm 49, forming a rough "U-clip." Support clip 2 can then be placed around the upper edge 27 of vehicle window 9 as illustrated in FIG. 11. Though support clip 2 is shown engaged to upper edge 27 of vehicle window 9, it should be understood that support clip 2 can also engage a side edge of vehicle window 9, or any other substantially planar surface of a thickness comparable to that of vehicle window 9. When engaged to vehicle window 9, exterior arm 49 contacts the exterior surface 54 of vehicle window 9 and interior arm 48 contacts the interior surface 55 of vehicle window 9, with upper ends 50 & 52 of both arms 48 & 49 being oriented toward upper edge 27 of vehicle window 9.

In the preferred embodiment shown, both interior arm 48 and exterior arm 49 are substantially flat and rectangular in cross-section. Though it is not necessary for this invention, these cross-sections are substantially consistent along the length of arms 48 & 49, which helps (1) to avoid weak spots on arms 48 & 49 which would be susceptible to breakage and (2) to simplify manufacturing. Width 56 (previously illustrated in FIG. 4) of interior and exterior arms 48 & 39 is relatively large in comparison to the thickness 57 of arms 48 & 49, and this large width 56 provides a large contact area between vehicle window 9 and interior and exterior arms 48 & 49. This large contact area in turn helps prevent twisting of interior and exterior arms 48 & 49 about their respective long axes and helps distribute the forces exerted by interior and exterior arm 48 & 49 against vehicle window 9 over a greater area.

In the preferred embodiment of FIG. 11, upper end 52 of exterior arm 49 is connected to a bridge 59, which in turn is connected to upper end 50 of interior arm 48. Curved bridge 59 of the preferred embodiment advantageously offers improved resistance to breakage in the area of engagement between exterior arm 49 and interior arm 48. Bridge 59 also permits substantially uniform width among interior arm 48, exterior arm 49 and bridge 59, which is particularly advantageous when those features are formed through injection molding. However, it is to be understood that the use of a bridge is not a requirement of the instant invention, and that exterior arm 49 may directly (or otherwise) engage interior arm 48 without the use of a bridge.

In the preferred embodiment shown in FIG. 11, the size of bridge 59 is limited to create a distance between upper ends 50 & 52 of interior and exterior arms 48 & 49 approximately equal to the thickness 60 of vehicle window 9. This promotes a snug fit between vehicle window 9 and support clip 2. When not engaged to vehicle window 9, the distance between lower ends 51 & 53 of arms 48 & 49 of the illustrated embodiment is less than thickness 60 of vehicle window 9. As a result, a clamping force is exerted by lower ends 51 & 53 of arms 49 & 48 onto vehicle window 9, strengthening the engagement between support clip 2 and vehicle window 9.

In the preferred embodiment illustrated in FIG. 11, lower end 51 of interior arm 48 curves away from interior surface 55 of vehicle window 9, terminating in a first flare 61. Similarly, lower end 53 of exterior arm 49 curves away from exterior surface 54 of vehicle window 9, terminating in a second flare 70. These flares 61 & 70 aid in the application of support clip 2 onto vehicle window 9. Flares 61 & 70 are especially advantageous when the clamping force described above is utilized, and the distance between lower ends 51 & 53 of arms 48 & 49 when not engaged to vehicle window 9 is less than thickness 60 of vehicle window 9.

FIG. 11 illustrates a preferred embodiment in which a portion of mounting base 3 also serves as part of exterior arm 49. In the embodiment shown, the interior wall 62 of mounting base 3 also acts as a lower portion of exterior arm 49. The dual function of interior wall 62 advantageously simplifies construction and provides an acceptable means for engaging support clip 2 to mounting base 3. It should be understood that this invention does not require a portion of mounting base 3 to serve such a dual function.

Another facet of the embodiment illustrated in FIG. 11 is the use of an extension 63 of exterior arm 49 above mounting base 3. Extension 63 allows upper ends 50 & 52 of both exterior arm 49 and interior arm 48 to be respectively inserted into a slot 64. In embodiments including bridge 59, bridge 59 is also inserted into slot 64. When device 1 is not in use, slot 64 receives edge 27 of vehicle window 9 to which the instant invention would otherwise be engaged. As upper ends 50 & 52 of arms 48 & 49 are inserted into slot 64, upper end 52 of exterior arm 49 is compressed between exterior surface 54 of vehicle window 9 and the interior surface of slot 64. This compression aids the support of the instant invention and reduces the stress experienced in the area of engagement between exterior arm 49 and interior arm 48 including, if in use, bridge 59.

Figure 12:
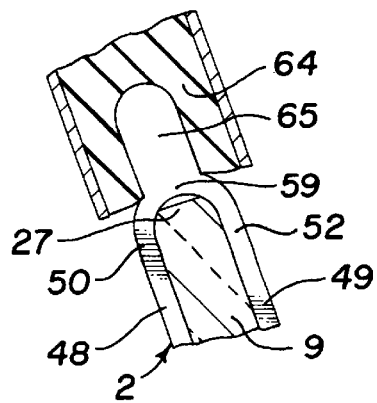
FIG. 12 is a forward view of the support clip of an alternate embodiment of the flag holding device engaged to a vehicle window and slot.

FIG. 12 provides an alternate embodiment of the invention, in which support clip 2 further includes a tab 65 extending upward from bridge 59 for insertion into slot 64. The use of tab 65 may be especially helpful when slot 64 is too narrow to receive the upper ends 50 & 52 of the arms 48 & 49.

Support clip 2 is preferably sufficiently rigid to maintain any engaged shafts in a substantially upright position (i.e. with shafts 6 & 7 having an orientation during host vehicle travel substantially similar to the orientation experienced while the host vehicle is at rest) when exposed to the wind resistance and directional changes associated with host vehicle travel. Support clip 2 is also preferably sufficiently flexible to serve a shock absorption function during similar conditions. Shock absorption occurs when a support clip elastically deforms to reduce the stress imparted upon both the shaft and the support clip by wind resistance or sudden changes in the direction or velocity of host vehicle travel. Shock absorption capability is particularly advantageous when (1) shafts are constructed from a frangible material, such as wood, or (2) greater wind resistance is generated through the use of multiple shafts. Support clips performing such dual functions may be described as "flexibly engaging" a vehicle window. The flag holding devices of the prior art have not addressed these particular problems, and the instant invention advantageously provides improved performance in these areas.

The preferred embodiments of support clip 2 illustrated in FIGS. 11 & 12 seek to balance the desire for support clip 2 rigidity and flexibility through both their design and construction materials. Support clip 2 is preferably manufactured through injection molding of a polymeric compound. Polypropylene is the preferred construction material, though other acceptable polymeric compounds include, but are not limited to: polyethylene, polystyrene, and polyvinyl chloride. Other vinyls, nylon, and lexan may also be used.

The ratio of interior and exterior arm thickness to interior and exterior arm width is preferably within the range ½ to 1/10, more preferably within the range of ¼ to ⅛, and most preferably approximately ⅙. Not only does this ratio balance support clip flexibility and rigidity, it also provides the aforementioned large contact area between the interior and exterior arms and the vehicle window. The dimension of arm thickness, at least with respect to devices engaging a pair of standard 0.25 inch diameter wooden shafts, is preferably with the range of 0.075 to 0.175 inches, more preferably within the range of 0.1 to 0.15 inches, and most preferably approximately 0.125 inches. The dimension of arm width, at least with respect to devices engaging a pair of standard 0.25 inch diameter wooden shafts, is preferably with the range of 1.25 to 0.25 inches, more preferably within the range of 1 to 0.5 inches, and most preferably approximately 0.75 inches. The preferred dimensions offer both substantial support to the shafts and a significant shock absorption effect.

As previously stated, mounting base 3 is preferably integrally attached to support clip 2. More preferably, mounting base 3 is also constructed through injection molding from the same material as support clip 2. This offers advantages in both simplicity of manufacturing and in providing a secure engagement between window support 2 and mounting base 3. Advantageously, the polymeric compounds preferred for the construction of support clip 2 are also capable of producing the desire rigidity in mounting base 3, especially when mounting base 3 incorporates such features as shoulders 47, 67, 68, & 69.

When injection molded as a single piece, mounting base 3 and support clip 2 are preferably manufactured using a single gate mold with multiple subgates. The embodiments previously illustrated offer examples of device design appropriate for such manufacturing techniques. The designs facilitate single gate injection molding in two ways. First, the thicknesses of the various arms, surfaces, shoulders and walls are highly similar, varying in the illustrated embodiments only within the range of 0.125 inches to 0.25 inches. Second, the location of the various surfaces of sockets 4 & 5 and locking structures ensures that in at least one direction (in this case along ordinary line of travel 26) no two surfaces overlap. Overlapping of this variety greatly complicates injection molding.

Though the above description relates several embodiments of the instant invention, variations and additional features and functions within the skill of the art are also intended to be covered. Furthermore, though the flag holding device is often described as engaging a "vehicle window," is should be understood that the device may also be used in conjunction with other planar surfaces of appropriate thickness, and there where not claimed as an element of the invention the term "vehicle window" is intended to encompass such surfaces.

What is claimed is:

1. A flag holding device adapted to removably hold a first shaft and a second shaft to a vehicle window, the device comprising:
   (a) a mounting base comprising:
      a first socket adapted for receiving the first shaft, said first socket defining a first central axis;
      a second socket adapted for receiving the second shaft, said second socket defining a second central axis, wherein said second central axis has an orientation with respect to said first central axis such that said second central axis intersects said first central axis within said base;
   (b) a support clip coupled to said mounting base; and
   (c) a locking structure disposed within said base for locking the shafts within said sockets.

2. The flag holding device of claim 1, wherein said mounting base further comprises a first displacing surface disposed adjacent said first socket.

3. The flag holding device of claim 2, wherein said mounting base further comprises a second displacing surface disposed adjacent said second socket.

4. The flag holding device of claim 1, wherein said mounting base further comprises a compression surface disposed adjacent said first socket.

5. The flag holding device of claim 4, wherein said mounting base further comprises a second compression surface disposed adjacent said second socket.

6. A flag holding device adapted to hold a shaft in a plurality of orientations, the device comprising:
   (a) a mounting base comprising:
      a first socket adapted to selectively receive the shaft, said first socket defining a first central axis;
      a first locking structure disposed with said first socket;
      a second socket adapted to selectively receive the shaft, said second socket defining a second central axis, wherein said first central axis intersects said second central axis within said base; and
      a second locking structure disposed within said second socket; and
   (b) a support clip coupled to said mounting base.

7. A flag holding device comprising:
   first and second shafts;
   a mounting base comprising:
      a first socket for receiving said first shaft, said first socket defining a first central axis approximately along which said first shaft will be received;
      a second socket for receiving said second shaft, said second socket defining a second central axis approximately along which said second shaft will be received, wherein said second central axis has an orientation with respect to said first central axis such that after insertion said second shaft will engage said first shaft; and
   a support clip coupled to said mounting base.

8. A flag holding device comprising:
   a vehicle window having an interior surface and an exterior surface;
   a shaft that is substantially cylindrical in shape,
   a mounting base having a socket for receiving said shaft and a locking structure for holding said shaft to said mounting base, and
   a support clip coupled to said mounting base and having an interior arm and an exterior arm, said interior arm and exterior arm having upper ends and lower ends, and said upper end of said exterior arm engaging said upper end of said interior arm so that when said support clip is attached to said vehicle window the exterior arm of said support clip contacts the exterior surface of said vehicle window and said interior arm of said support clip contacts the interior surface of said vehicle window, so that said support clip serves a shock absorption function while maintaining said shaft in a substantially upright position.

9. A flag holding device adapted to removably hold a shaft and flexibly engage a vehicle window, the window having a thickness and having an interior surface and an exterior surface, the device comprising:
   (a) a shaft that is substantially cylindrical in shape and having a diameter, (b) a mounting base having a socket for receiving said shaft and a locking structure for holding said shaft to said mounting base, said locking structure including a first locking surface, a second locking surface, and a third locking surface, said shaft contacting said first, second, and third locking surfaces in that order when inserted into said mounting base, and (c) a support clip coupled to said mounting base and having an interior arm and an exterior arm, said interior arm and said exterior arm having upper ends and lower ends, and said upper end of said exterior arm engaging said upper end of said interior arm, said clip arms adapted to engage the interior and exterior surfaces of the window, so that said support clip serves a shock absorption function while maintaining said shaft in a substantially upright position.

10. The flag holding device claim 9, inclusive, wherein said mounting base and said support clip are integrally engaged and injection molded.

11. The flag holding device of claim 9, wherein said device is injected molded in a single gate mold with multiple subgates.

12. The flag holding device of claim 9, wherein said first and third locking surfaces are substantially co-planar and said first, second, and third locking surfaces are substantially parallel, and wherein the distance between a plane defined by said first and third locking surfaces and a plane defined by said second locking surface is not more than said diameter of said shaft.

13. The flag holding device of claim 9, wherein said locking structure comprises a first locking surface, a second locking surface, and a third locking surface, wherein said socket defines a central axis along which said shaft will be received, and wherein the plane defined by said third locking surface intersects said central axis of said socket and forces said shaft against said first and second locking surfaces.

14. The flag holding device of claim 9, wherein a portion of said mounting base serves as a portion of said exterior arm of said support clip.

15. The flag holding device of claim 9, wherein said support clip further includes a bridge, said bridge coupling with said upper end of said exterior arm and coupling with said upper end of said interior arm.

16. The flag holding device of claim 15, wherein the distance between said upper end of said exterior arm and said upper end of said interior arm is not less than the thickness of the vehicle window.

17. The flag holding device of claim 15, wherein the distance between said lower end of said exterior arm and said lower end of said interior arm is less than the thickness of the vehicle window.

18. The flag holding device of claim 17, wherein said lower end of said interior arm terminates in a first flare, and wherein said lower end of said exterior arm terminates in a second flare.

19. The flag holding device of claim 9, wherein said interior and exterior arms of said support clip are substantially rectangular in cross-section.

20. The flag holding device of claim 19, wherein the ratio of the thickness of said interior and exterior arms to the width of said interior and exterior arms is between ½ and 1/10, inclusive.

21. The flag holding device of claim 19, wherein the ratio of the thickness of said interior and exterior arms to the width of said interior and exterior arms is between ¼ and ⅛, inclusive.

22. The flag holding device of claim 19, wherein the ratio of the thickness of said interior and exterior arms to the width of said interior and exterior arms is approximately ⅙.

23. The flag holding device of claim 19, wherein thickness of said interior and exterior arms is approximately 0.125 inches and the width of said interior and exterior arms is approximately 0.75 inches.

24. The flag holding device of claim 9, wherein said support clip is constructed from a polymeric compound.

25. The flag holding device of claim 9, wherein said support clip is constructed from a polymeric compound selected from the group consisting of polyethylene, polypropylene, polystyrene, and polyvinyl chloride.

26. The flag holding device of claim 9, wherein the support clip is constructed from polypropylene.

27. A flag holding device comprising:
a vehicle window;
a substantially cylindrically shaped shaft;
a mounting base comprising:
a first socket, said first socket defining a first central axis approximately along which said shaft is selectively received;
a first locking structure for holding said shaft to said mounting base when said shaft is inserted into said first socket;
a second socket, said second socket defining a second central axis approximately along which said shaft is selectively received, wherein said first central axis is not co-linear with said second central axis, such that said shaft inserted into said first socket will achieve an orientation different than that said shaft would achieve if inserted into said second socket; and
a second locking structure for holding said shaft to said mounting base when said shaft is inserted into said second socket; and
a support clip coupled to said mounting base for attaching said base to said window.

\* \* \* \* \*